Figure 1:
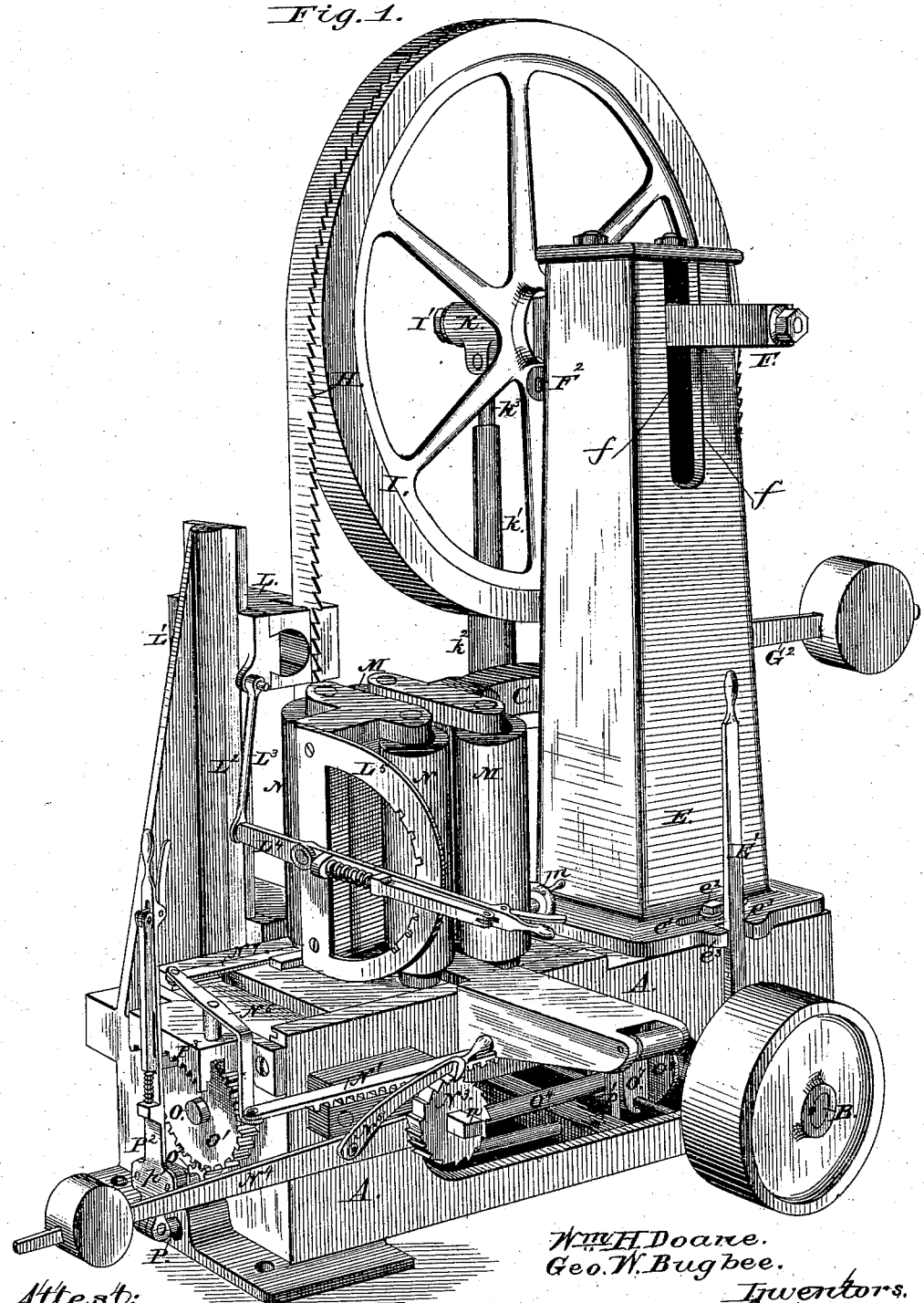

4 Sheets—Sheet 3.

W. H. DOANE & G. W. BUGBEE.
BAND SAW-MILLS.

No. 194,225. Patented Aug. 14, 1877.

Attest:
H. L. Perrine
Fred A. Neale

Wm. H. Doane.
Geo. W. Bugbee.
Inventors

By _____ Attorney.

4 Sheets—Sheet 4.
W. H. DOANE & G. W. BUGBEE.
BAND SAW-MILLS.
No. 194,225. Patented Aug. 14, 1877.
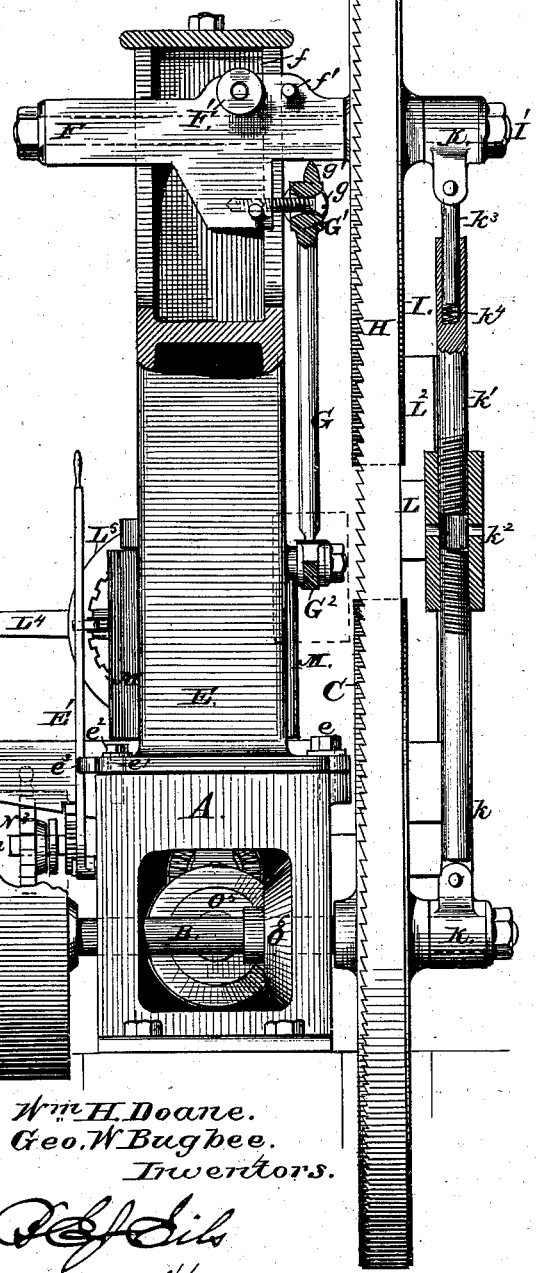
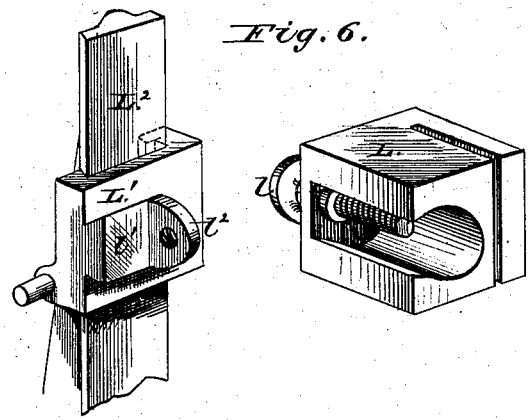
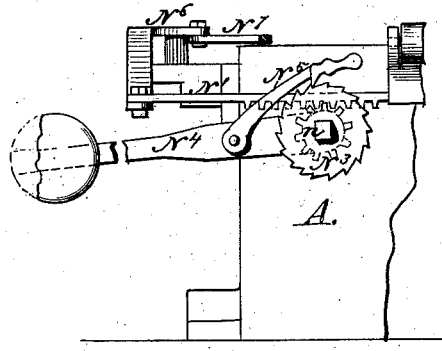
Wm. H. Doane.
Geo. W. Bugbee.
Inventors.
Attest:

UNITED STATES PATENT OFFICE.

WILLIAM H. DOANE AND GEORGE W. BUGBEE, OF CINCINNATI, OHIO, ASSIGNORS TO J. A. FAY & CO., OF SAME PLACE.

IMPROVEMENT IN BAND-SAW MILLS.

Specification forming part of Letters Patent No. 194,225, dated August 14, 1877; application filed June 30, 1877.

*To all whom it may concern:*

Be it known that we, WILLIAM H. DOANE and GEORGE W. BUGBEE, of Cincinnati, in the county of Hamilton and State of Ohio, have invented certain Improvements in Band-Saws, of which the following is a specification:

This invention relates, as to some of its features, to band-saws generally, and, as to other features, more especially to that class of machines known to the trade as "band resawing-machines," designed for resawing timbers and plank into thin boards, and wide boards into thin boards adapted for backings for picture-frames, bottoms for drawers, panels, boxes, &c.

The object of these improvements is to govern the path of the saw on the upper saw-pulley (for the purpose of regulating the back thrust of the saw on its guides) without stretching the saw more on one side than on the other, which unequal straining of the saw is very objectionable, and must necessarily result when the said pulley is tipped or canted—the method heretofore in common use for governing the path of the saw. Also, to so mount the bearing of the upper pulley-arbor on the column or stand that the adjustment of said bearing to strain the saw will always be accomplished in a true vertical line, with a minimum of frictional resistance. Also, to equalize the strain of the saw-pulley arbors on their inside bearings—that is to say, to provide means whereby the strain is distributed equally over the entire bearing-surfaces, so that the pulley-arbors will run true, and heating of the arbors and bearings be obviated. Also, to so arrange the saw-guides that they will always remain in true alignment after proper adjustment, and bear equally the back thrust of the saw. Also, to facilitate the adjustment of the guides to the back of the saw and their ready removal in case the saw is to be taken off. Also, to provide means for the convenient vertical adjustment of the upper saw-guide from the front side of the machine, where the operator takes his position. Also, to so construct the mechanism for pressing the movable feed-rolls against the stuff that the pressure may be instantaneously relieved simultaneously with the retraction of these feed-rolls, so that the stuff can be quickly drawn back in case the saw "runs." Also, to provide a more convenient and efficient means for changing the speed of the feed-rolls.

In the machine presently to be more specifically described these various objects are accomplished by the following means: The stand supporting the bearing of the upper saw-pulley arbor is pivoted upon the bed-frame at a point in about the plane of the front side of the saw, and in the vertical axial plane of the lower saw-pulley, so that by turning the stand on its pivot the upper saw-pulley can be arranged to run in a plane oblique to the plane of the lower saw-pulley, thereby shifting the path of the saw, at the same time maintaining the parallelism of the peripheral surfaces of the two saw-pulleys.

The bearing of the upper saw-pulley is combined with anti-friction rollers arranged to run on the exterior and interior sides of the ways of the stand, in such a manner as to permit of the required adjustment of the bearing to dispose it in a horizontal plane parallel to that of the lower saw-pulley arbor.

The overhung ends of the two saw-pulley arbors are coupled together by a straining-rod, carrying a pivoted bearing at each end to connect onto the arbors. This straining-rod is adjustable in length, so that it can be made to act on the arbors with a spreading force sufficient to equalize the strain of said arbors on their inside bearings, compensating for the tendency of the saw to draw the arbors toward each other, and cause them to grind into their inside bearings.

Both saw-guides are supported on the same standard. The guides proper are mounted on slides intermediate between them and the supporting-standard, providing for their lateral adjustment and ready removal.

The upper guide is combined with a lever mechanism for vertical adjustment, the hand-lever being so located as to extend to the side of the machine, where it is in convenient reach of the operator.

The movable feed-rolls are pressed against the stuff by a weighted lever through intermediate rack and pinion, (and lever-and-link connection in this instance,) the weighted lever acting through a pawl on a ratchet-wheel on the pinion-shaft, so that by simply disengaging the pawl the pressure upon the feed-rolls can be instantly relieved.

The friction-pinion for driving the feed-gearing is fixed on its shaft, and the friction-disk on which the pinion operates is carried on the end of a rod, connected at its other end, by a knuckle-joint, to the shaft of the first wheel of the feed-gearing. The rod carrying the friction-disk is swung laterally to change the speed of the feed-rolls by a lever through the medium of a rock-shaft and arm.

The several combinations and arrangements of the instrumentalities claimed as new are concisely set forth in the claims at the close of this specification.

The best forms of our invention so far devised by us are represented in the accompanying drawings, in which—

Figure 2:
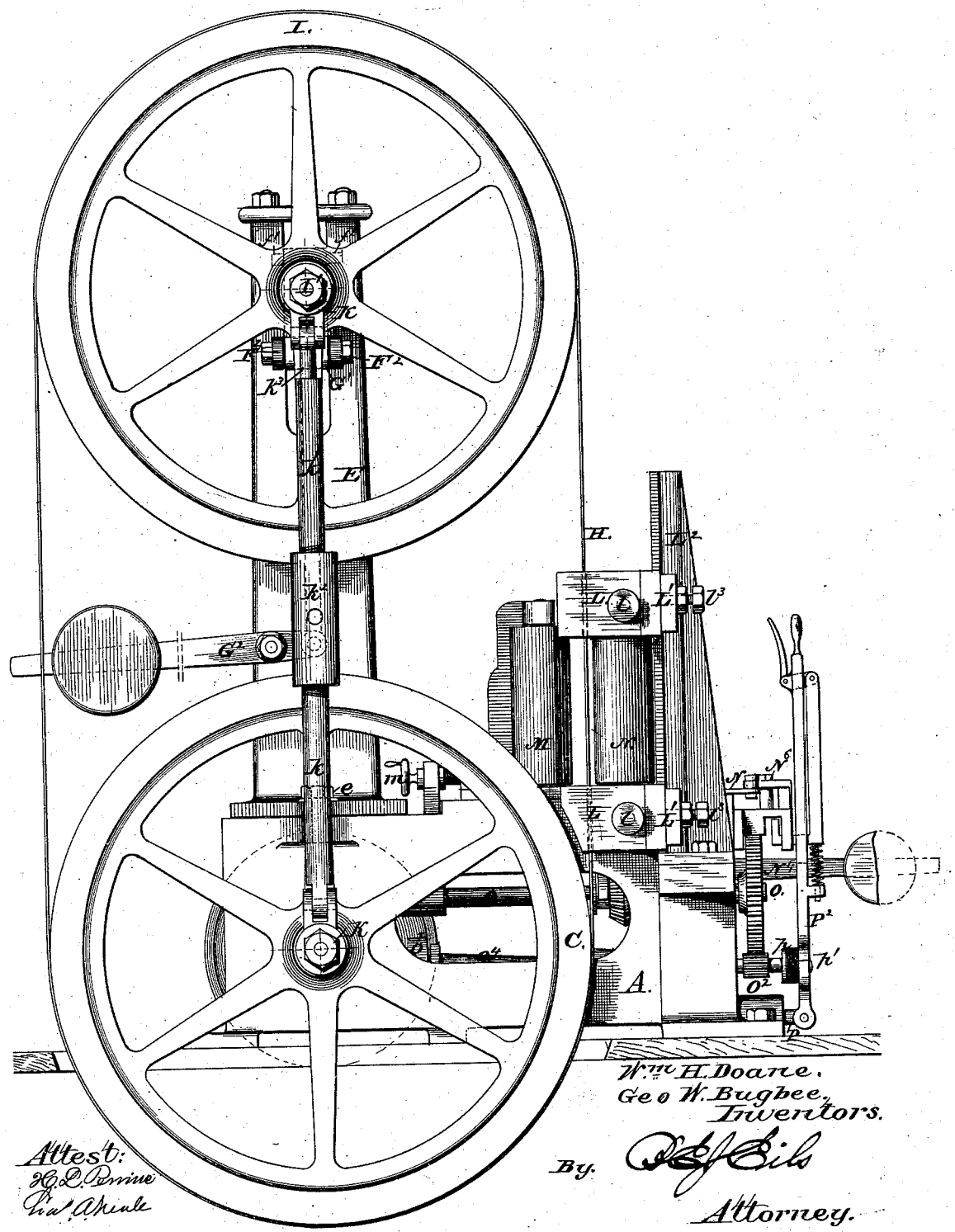
Figure 3:
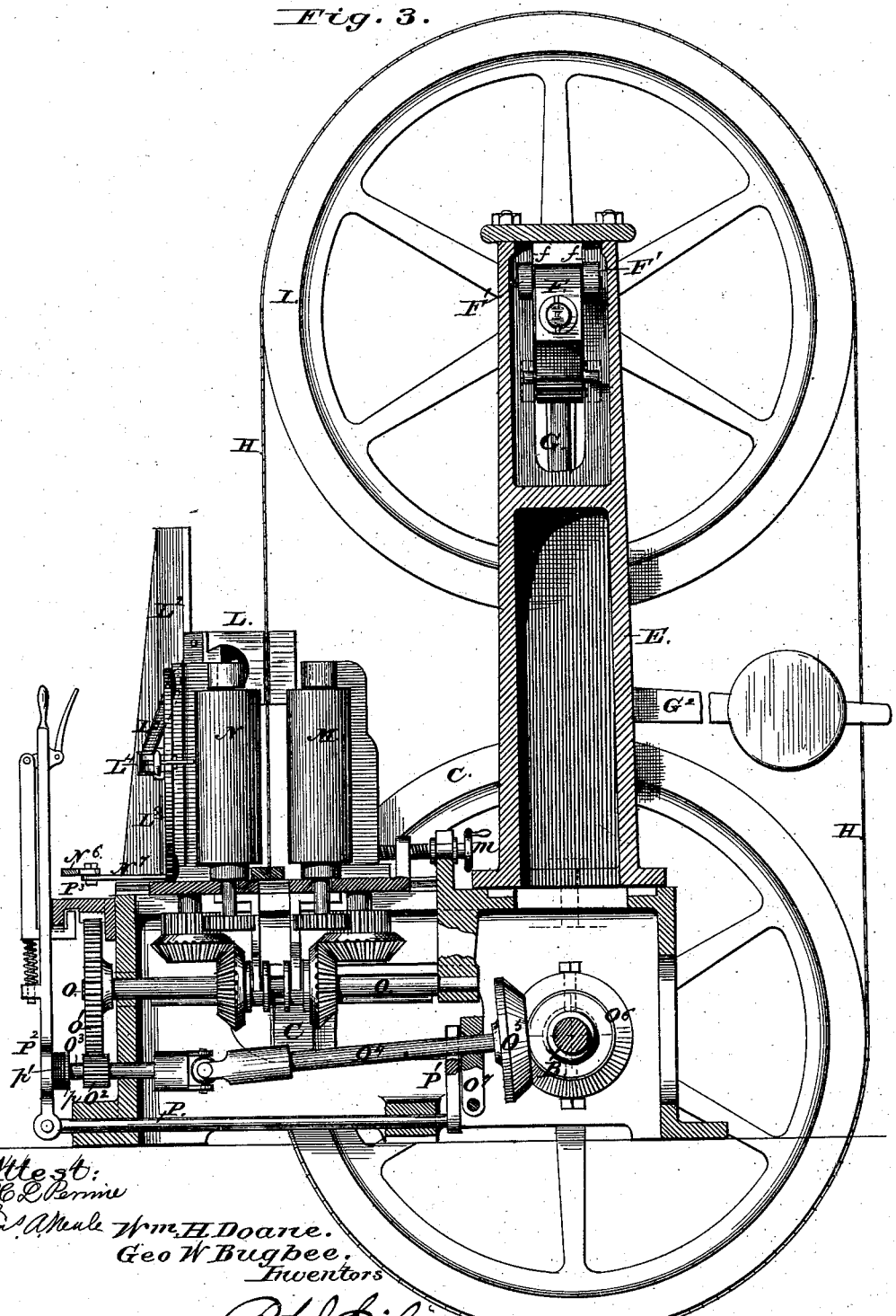

Figure 1 is a perspective view of the machine. Fig. 2 is a rear elevation of the same. Fig. 3 is a sectional elevation thereof. Fig. 4 is a sectional end view. Figs. 5 and 6 are detail views.

The same letters of reference are used in all the figures in the designation of identical parts.

A refers to the bed-frame of the machine, adapted to give support to the various parts of which the machine is composed. The lower pulley-arbor B is arranged across the bed-frame, near one end thereof, turning in suitable bearings supported within encircling fixed rings by center-screws, in the usual manner, admitting of a delicate adjustment of the plane of the shaft or arbor. The lower saw-pulley C is fixed to the arbor B near one end, the driving-pulley being secured to the other end.

E refers to the stand or column which supports the bearing F at its upper bifurcated end. It is pivoted to the bed-frame A at $e$, a point located in about the plane of the front edge of the saw, and vertically over the axis of the lower saw-pulley arbor, as shown in Fig. 3. On the opposite side of the column the flange around its base has a segmental slot, $e^1$, through which a clamping-bolt, $e^2$, passes into the bed-frame, to permanently secure the column in position after it has been properly adjusted. A long lever, E', pivoted on the bed-frame and passing up through lugs $e^3$ on the base flange of the drum, is used to adjust the latter.

Other means—such, for instance, as a screw or gearing—will readily suggest themselves as equivalents of the lever for turning the column on its pivot.

The bearing of the upper saw-pulley arbor necessarily partakes of the movements of the column. Thus by turning the column the direction of the axial line of this arbor may be changed with reference to that of the lower arbor B, so that the plane of rotation of the upper saw-pulley may either be coincident with or intersect the plane of rotation of the lower saw-pulley at a greater or less angle. This adjustment preserves the parallelism of the peripheral surfaces of the two saw-pulleys, and changes the path of the saw without disturbing its equal tension.

The bearing F is snugly fitted between the ways at the front and rear sides of the column, and is confined to the ways $ff$ by the anti-friction rollers $F^1$ $F^1$ $F^2$ $F^2$ and the pins or studs $f^1$ and $f^2$. The anti-friction rollers $F^1$ are arranged at the top of the bearing to run on the interior side of ways $f$, while the rollers $F^2$ are carried by the head $G^1$ of rod G, which is adjustably connected by a screw, $g$, to the downward projection of the bearing. The rollers $F^2$ run on the exterior side of ways $f$, and, together with the rollers $F^1$, form a carriage for the bearing bound to cause it to move vertically with certainty and accuracy, and that with a minimum of frictional resistance. By running screw $g$ in or out the bearing can be properly adjusted with reference to the horizontal plane of the lower arbor B. The rod G is connected to the short arm of weighted lever $G^2$, which is fulcrumed on the column, and exerts a constant upward pressure through said rod upon the bearing F, keeping the saw strained to the desired degree. A projecting rib, $g'$, on the top of the head $G^1$ of rod G, is in contact with the under side of the bearing, so that there is no upward strain on adjusting-screw $g$.

H refers to the saw, and I to the upper saw-pulley, secured to the overhung end of arbor I'. The saw-pulley arbor protrudes some distance beyond the hubs of the pulleys, to receive each a sleeve or bearing, K. These sleeve-bearings are connected by a straining-rod composed of the bars $k$ and $k^1$, adjustably connected by a sleeve-coupling, $k^2$, with right and left screw-threads adapted to corresponding threads on adjacent ends of these bars, and a third bar, $k^3$, fitted in a socket in bar $k^1$ upon an elastic cushion, $k^4$. The bars $k$ and $k^3$ are pivoted with their extremities to the sleeve-bearings K. By turning the sleeve-coupling $k^2$ the length of the straining-rod can be adjusted so as to exert the degree of spreading action on the saw-pulley arbors required to compensate for the opposite strain put upon them by the saw, and thus cause the arbors to run true in their bearings. The elastic cushion $k^4$ provides for the changes in the length of the saw caused by expansion or contraction.

The saw-guides L are adjustably connected to horizontal ways $l^1$ on the slides $L^1$ by means of screws $l$. The ways $l^1$ are provided with a lug, $l^2$, containing the nut in which the screw $l$ operates, the screw being permanently connected to the guide, whose side is suitably chambered out, so that it can move in and out over lug $l^2$. By means of the screws $l$ the guides may be readily adjusted to the back of the saw, or entirely removed when that becomes necessary. Both slides $L^1$ of the guides are carried on the same standard, $L^2$, rigidly secured to the bed-frame in the proper position with reference to the path of the saw. The guides being thus supported on the same rigid standard, they will always maintain the alignment to which they have been adjusted—a feature of most vital importance.

The slide carrying the upper saw-guide proper is connected by a link, $L^3$, to one arm of a lever, $L^4$, extending to the front side of the machine, so that it is in convenient reach of the operator, who, through means of it, can vertically adjust the upper guide without leaving his post.

The lever is provided with the common spring-latch for locking it in any required position to a fixed toothed segment or arch, $L^5$, which, in this instance, is secured to the frame of the movable feed-rolls, on which the lever is also fulcrumed.

Both guides may be permanently secured on their common standard by set-screws $l^3$. (Seen in Fig. 2.)

A narrow platen is arranged transversely across the top of the bed-frame, in front of the saw, over which the stuff is fed by the two sets of vertical feed-rolls, M M and N N, journaled, respectively, in suitable frames adapted to slide in ways on the bed-frame. The frame of the feed-rolls M can be adjusted by screw $m$, which holds it in a fixed position. The feed-rolls N are movable to exert a constant pressure on the stuff and adapt themselves to inequalities in its thickness, to warped stuff, &c. To this end the frame of these movable rolls N is connected with a sliding rack, $N^1$, which meshes with a pinion, $N^2$, fixed on a short shaft, $n$, at the front side of the machine. A ratchet-wheel, $N^3$, is also fixed on this shaft.

A weighted lever, $N^4$, is pivoted on shaft $n$, and provided with a pawl, $N^5$, adapted to engage the teeth of the ratchet-wheel $N^3$. The rack $N^1$ is connected, by a lever, $N^6$, and link $N^7$, to the frame of rolls N, so that under the arrangement of the parts here shown the weighted lever may, when its pawl is engaged with the ratchet-wheel, push the rolls N toward the rolls M, as required.

It will be observed that the movable feed-rolls N may be instantaneously relieved of the action of the weighted lever $N^4$ by simply disengaging pawl $N^5$ from the ratchet-wheel, to facilitate which the pawl is provided with a handle, as shown. The ratchet and pawl also make it possible to maintain the horizontality of the lever, whatever may be the position of the movable feed-rolls. The weight of the lever is adjustably secured, so that the pressure of the movable feed-rolls can be duly regulated.

The lower journals of the feed-rolls are provided with spur-wheels, the wheels of each set meshing with an intermediate driving-pinion on a shaft driven by bevel-gearing from a horizontal shaft, O, underneath, the bevel-wheels on said horizontal shaft being connected with the respective frames of the two sets of feed-rolls, to slide back and forth therewith. This being the common arrangement for driving feed-rolls such as here used, it requires no more specific description. The horizontal shaft O extends through the end of the bed-frame, and carries a spur-wheel, $O^1$, which is driven by a small pinion, $O^2$, on shaft $O^3$, adapted to slide to a limited extent in its bearings. The inner end of shaft $O^3$ is connected by a knuckle-joint to the bar or rod $O^4$, the other end of which carries a friction-disk, $O^5$, which is driven, to turn the rod and impart rotary motion to the feed-rolls, by a friction-pinion, $O^6$, on the lower saw-pulley arbor B. Near the friction-disk $O^5$ rod $O^4$ is supported by a bearing, $O^7$, adapted to slide laterally on its support in conformity with the lateral adjustments of the rod carrying the friction-disk, whereby the speed of the feed-rolls is regulated. The rod $O^4$ is swung toward or away from the friction-pinion $O^6$, thereby changing the position of the friction-disk with reference thereto, and diminishing or increasing the speed of the feed-rolls, by an arm, $P^1$, on the rock-shaft P. This rock-shaft is operated and controlled by a lever, $P^2$, pivoted to its protruding end at the outside of the bed-frame. The lever $P^2$ is provided with a spring-latch, to lock it in any required position to the toothed arch or segment $P^3$ fixed on the bed-frame. At the point opposite the shaft $O^3$ the lever $P^2$ is provided with a plate, $p$, seated upon or against a rubber or other elastic cushion, $p'$. This plate acts with a constant pressure against the end of shaft $O^3$, and causes the disk $O^5$ to be pressed forcibly against the pinion $O^6$.

We are aware that in the band-saw described in United States Letters Patent No. 120,949, provision is made for adjusting the lower saw-pulley by turning its arbor horizontally. This adjustment is for a purpose wholly different from the object accomplished by our adjustment of the upper saw-pulley, as will readily appear by comparing the respective descriptions bearing on these features. It is also apparent that the lower saw-pulley of said patented machine cannot be so adjusted after it has been once put in position without disturbing the alignment of its driven pulley on the counter-shaft or line-shaft.

We do not now claim anything shown in said Letters Patent.

What we claim as our invention, and desire to secure by Letters Patent, is—

1. A band-saw in which the support of the bearing of the upper saw-pulley arbor is adapted for adjustment, substantially as described, whereby the upper saw-pulley can be set to rotate in a plane either coincident with or obliquely intersecting the plane of rotation of the lower saw-pulley.

2. The combination, substantially as specified, of the column provided with vertical ways, the bearing of the upper saw-pulley arbor, and the two sets of anti-friction rollers, one set being arranged near the top of the bearing to run on the interior side of the ways, and the other set near the bottom of the bearing to run on the exterior side of the ways.

3. The combination, substantially as specified, of the column provided with vertical ways, the bearing of the upper saw-pulley arbor, provided with fixed pins or studs $f^1$ and $f^2$, the two sets of anti-friction rollers, arranged as hereinbefore set forth, and the adjusting-screw.

4. The combination, substantially as specified, of the two saw-pulley arbors, the outside sleeve-bearings on the overhung ends thereof, and the straining-rod, adjustable in length.

5. The combination, substantially as specified, of the two saw-pulley arbors, the outside sleeve-bearings on the overhung ends thereof, and the straining-rod, adjustable in length, and adapted to automatically change in length to a limited extent to compensate for the contraction and expansion of the saw.

6. In a band-saw, the combination, substantially as specified, of the upper and lower saw-guides and an independent and permanently fixed supporting-standard common to both guides.

7. The combination, substantially as specified, of an independent and permanently-fixed supporting-standard, the vertically-adjustable slide, the guide proper, riding on a horizontal way or ways on the slide, and means for adjusting the guide proper horizontally.

8. The combination, substantially as specified, of the upper saw-guide and the lever for adjusting it vertically from the front side of the machine.

9. The combination, substantially as specified, of the movable feed-rolls, the sliding rack connected with the frame thereof, the pinion, the weighted lever, the hinged pawl thereof, and the ratchet-wheel on the arbor of the pinion.

10. The combination, substantially as specified, of the fixed friction-pinion, the friction-disk, the rod connected by knuckle-joint at one end to shaft $O^3$, and adapted to be swung laterally for shifting the friction-disk it carries at the other end, and the laterally-adjustable bearing of the rod.

11. The combination, substantially as specified, of shaft $O^3$, the rod connected thereto by a knuckle-joint, and carrying the friction-disk, the laterally-adjustable bearing of said rod, the rock-shaft, the arm thereon, and the lever for operating the rock-shaft.

In testimony whereof we have signed our names to the foregoing specification in the presence of two subscribing witnesses.

W. H. DOANE.
GEORGE W. BUGBEE.

Witnesses:
CHAS. S. GROFF,
JOS. C. NOYES.